US005578682A

United States Patent [19]
White

[11] Patent Number: 5,578,682
[45] Date of Patent: Nov. 26, 1996

[54] BIMODALIZATION OF POLYMER MOLECULAR WEIGHT DISTRIBUTION

[75] Inventor: Donald A. White, Keasbey, N.J.

[73] Assignee: Exxon Chemical Patents Inc., Wilmington, Del.

[21] Appl. No.: 450,068

[22] Filed: May 25, 1995

[51] Int. Cl.[6] ................... C08F 255/10; C08F 255/02; C08F 279/02
[52] U.S. Cl. ................... 525/282; 525/287; 525/293; 525/305; 525/306
[58] Field of Search ................... 525/282, 287, 525/293, 305, 306; 528/502 F

[56] References Cited

U.S. PATENT DOCUMENTS

| | | | |
|---|---|---|---|
| 3,862,265 | 1/1975 | Steinkamp et al. | 260/878 R |
| 4,749,505 | 6/1988 | Chung et al. | 252/51.5 |
| 5,071,913 | 12/1991 | Powers et al. | 525/87 |

*Primary Examiner*—Vasu S. Jagannathan
*Attorney, Agent, or Firm*—Myron B. Kurtzman

[57] ABSTRACT

The present invention provides a post-polymerization process for modifying the molecular weight distribution of a polymer having a monomodal molecular weight distribution, which polymer normally exhibits a decrease in molecular weight when subjected to high shear mixing in the presence of a free radical initiator, to produce a polymer having a bimodal molecular weight distribution. The process comprises:

(a) heating a mixture of the polymer, a polyunsaturated crosslinking agent and, optionally, a free radical initiator, to form a uniform mixture; and (b) subjecting said mixture to high shear mixing conditions until a polymer having a bimodal molecular weight distribution is obtained. In the more preferred embodiment, the shear mixing is conducted in the presence of a free radical initiator such as an organic peroxide and the crosslinking agent is a difunctional compound containing diallyl, divinyl or diethylenic unsaturation.

The process results in the development of polymers having a bimodal molecular weight distribution as a consequence of the coupling of some of the free radically degraded polymer chains added through the unsaturated functionality of the crosslinking agent. The high molecular weight species in the bimodal distribution lends a higher melt strength to the polymer and the lower molecular weight species imparts improved processing and melt flow properties.

27 Claims, 1 Drawing Sheet

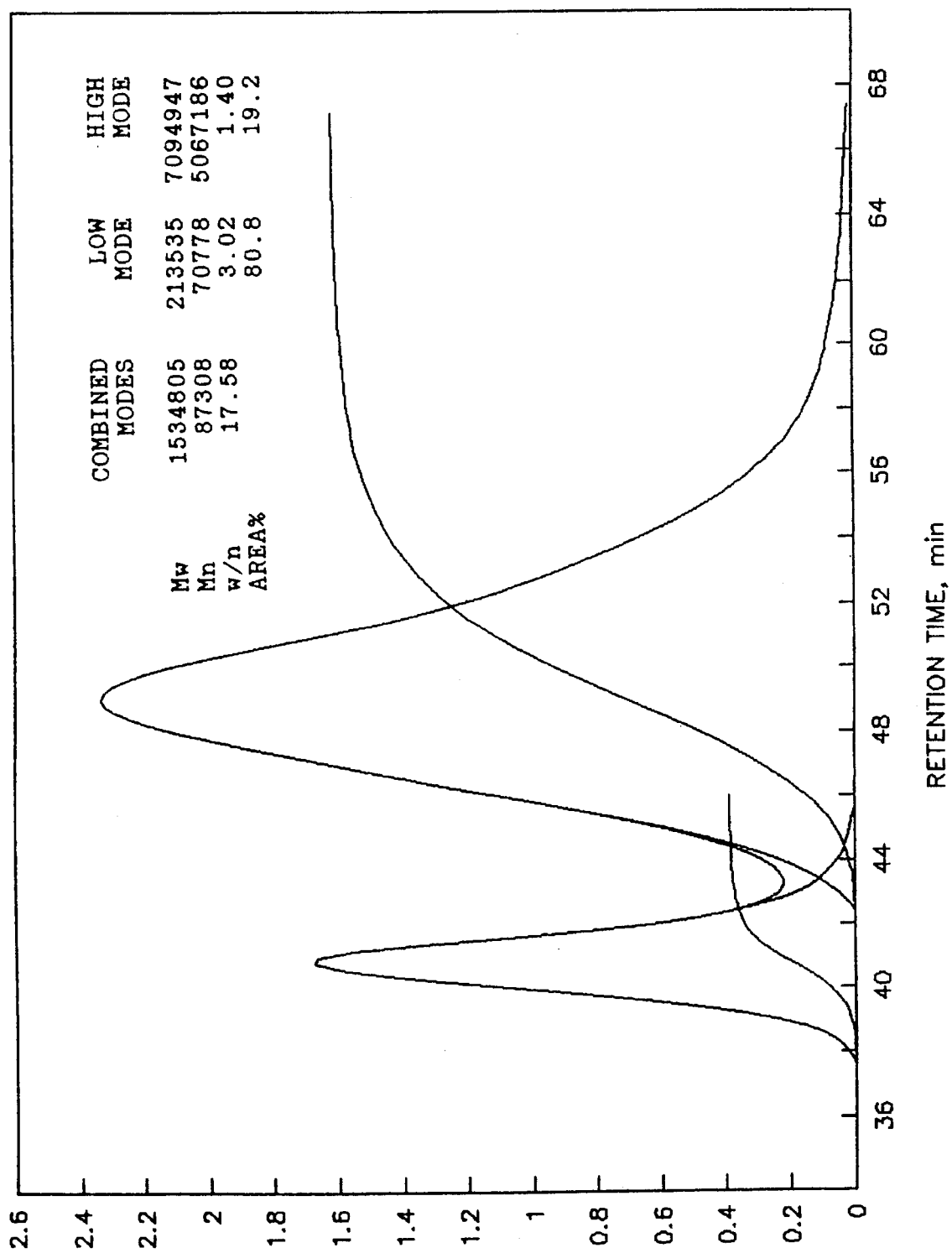

BIMODALIZATION OF POLYMER MOLECULAR WEIGHT DISTRIBUTION

BACKGROUND OF THE INVENTION

1. Field of the Invention

The present invention relates to a post-polymerization process for modifying the molecular weight distribution of polymers having an initial monomodal molecular weight distribution to produce polymers having a bimodal molecular weight distribution.

2. Description of Related Art

Some polymers such as polyethylenes or copolymers of ethylene with up to about 50 mole % of propylene or butene-1 are known to undergo a molecular weight increase when subjected to shear mixing in the presence of a free radical initiator such as an organic peroxide. This molecular weight increase may be intensified by the additional inclusion of polyfunctional (polyunsaturated) grafting agents. The use of such polyfunctional agents is recommended by manufacturers for the peroxide curing or crosslinking of copolymers of ethylene and propylene having a high ethylene content, e.g., at least about 50 mole % of ethylene.

Other polymers such as crystalline polypropylene, copolymers of propylene with up to 10 mole % ethylene, polyisobutylene, copolymers of a $C_4$ to $C_7$ isomonoolefin with up to 10 wt. % of isoprene or up to 20 wt. % para-alkylstyrene undergo a molecular weight decrease when subjected to shear mixing, especially in the presence of a free radical initiator, as disclosed for example in U.S. Pat. Nos. 3,862,265 and 4,749,505.

It is believed that the distinction between these mechanisms is that an extensive polymer chain network is developed in the high ethylene content polymers when treated as described above, whereas chain scission without any extensive polymer chain network development takes place when the other polymers are sheared, alone or in the presence of a free radical initiator.

Polymers having a bimodal molecular weight distribution have useful properties. The higher molecular weight species within the bimodal distribution imparts higher melt strength properties to the polymer while the lower molecular weight species within the bimodal distribution imparts better processing characteristics to the polymer.

Routes to such polymers typically involve incorporation of a small amount of a crosslinking agent into the polymerization process. In the manufacture of polybutadiene, divinylbenzene is used for this purpose (W. Hofman, "Rubber Technology Handbook", Hanser Publishers, New York, 1989, p. 55). Divinylbenzene is also used to produce "pre-crosslinked" nitrile rubber, which can be blended with normal nitrile rubber to create a polymer with a bimodal molecular weight distribution (W. Hofman, "Rubber Technology Handbook", Hanser Publishers, New York 1989, p. 69). Another polymer may be used as the crosslinking agent as in the production of star branched butyl polymers, as disclosed in U.S. Pat. No. 5,071,913.

Heretofore, no technique has been disclosed for a post-polymerization process for both reducing the extent of molecular weight decrease of polymers which normally undergo molecular weight decrease when subjected to shear mixing and providing a polymer having a bimodal molecular weight distribution.

SUMMARY OF THE INVENTION

The present invention provides a post-polymerization process for modifying the molecular weight distribution of a polymer having an initial monomodal molecular weight distribution, which polymer normally exhibits a decrease in molecular weight when subjected to high shear mixing in the presence of a free radical initiator, to produce a polymer having a bimodal molecular weight distribution. The process comprises:

(a) heating a mixture of the polymer, a polyunsaturated crosslinking agent and, optionally, a free radical initiator to form a uniform mixture; and (b) subjecting said mixture to high shear mixing conditions, until a polymer having a bimodal molecular weight distribution is obtained.

In the more preferred embodiment, the shear mixing is conducted in the presence of a chemical free radical initiator such as an organic peroxide and the crosslinking agent is a difunctional compound containing diallyl, divinyl or diethylenic (diolefinic) unsaturation.

The invention also provides for a polymer composition comprising polymeric material selected from the group consisting of polypropylene, copolymers of propylene with up to 10 mole % ethylene, polyisobutylene, copolymers of a $C_4$ to $C_7$ isomonoolefin with up to 10 wt % isoprene, copolymers of a $C_4$ to $C_7$ isomonoolefin with up to 20 wt % of para-alkylstyrene and mixtures thereof, said polymeric material having a number average molecular weight in the range of from about 5,000 up to 5,000,000, and characterized as having a bimodal molecular weight distribution containing a lower molecular weight species and a higher molecular weight species, said higher molecular weight species comprising at least about 1.0 weight percent of said polymeric material.

The process results in the development of polymers having a bimodal molecular weight distribution as a consequence of the coupling of some of the free radically degraded polymer chains added through the unsaturated functionality of the crosslinking agent. The high molecular weight species in the bimodal distribution imparts a higher melt strength to the polymer and the lower molecular weight species imparts improved processing and melt flow properties.

BRIEF DESCRIPTION OF THE DRAWING

The FIGURE is a plot of the GPC (DRI) chromatogram of the product of Example 18.

DETAILED DESCRIPTION OF THE INVENTION

Polymers which may be treated in accordance with this invention are conventionally polymerized amorphous and crystalline materials which exhibit a monomodal molecular weight distribution and which normally are subject to a decrease in molecular weight when subjected to high shear mixing in the presence of a free radical initiator. Such polymers demonstrate a reduction in molecular weight when subjected to high shear melt mixing due to the predominance of polymer chain scission which occurs under those conditions, leaving molecular chains of shorter length. This chain scission is further promoted by conducting the shear mixing in the presence of a chemical free radical initiator such as an organic peroxide. This is to be contrasted with a crosslinking promotion of molecular weight of some polymers, such as polyethylene, when processed under identical conditions. The latter polymers do not, however, exhibit a bimodal molecular weight distribution after such processing, but are rather composed of a complex intertwined polymer chain network.

Suitable starting polymers for use in the invention include olefin polymers and copolymers such as polypropylene, copolymers of propylene with up to 10 mole % ethylene, polyisobutylene, copolymers of a $C_4$ to $C_7$ isomonoolefin with up to 10 wt. % isoprene (butyl rubber) and random copolymers of a $C_4$ to $C_7$ isomonoolefin with up to 20 wt. % para-alkylstyrene, e.g., copolymers of isobutylene and para-methylstyrene.

Polymers useful for processing, in accordance with the present invention generally exhibit a number average molecular weight ($M_n$) in the range of from about 5,000 to about 5,000,000, more preferably from about 10,000 to about 1,000,000, as determined by Gel Permeation Chromatography. The polyunsaturated crosslinking agent which is mixed with the starting polymer to produce the bimodal polymers of this invention include di- and triunsaturated agents containing polyallyl, polyvinyl or polyethylenic unsaturation. These include agents selected from the group consisting of polymaleimides such as 1,3-phenylenebismaleimide, 1,4-phenylenebis maleimide and 1,8-bismaleimido-3,6-dioxaoctane; polyallylphosphates such as di-or triallylphosphate; polyallylcyanurates such as di-or triallycyanurate; polyallyl esters of organic acids such as diallyl isophthalate, diallylmaleate or diallyl phthalate; di or triallyl amine; alkylene glycol poly (meth) acrylates such as ethylene glycol dimethacrylate or propylene glycol di- or trimethacrylate; and polyvinyl benzenes such as di- or trivinylbenzene. Two or more of the above crosslinking agents may be used. The most preferred crosslinking agents are difunctional materials, particularly the diunsaturated bismaleimides, since these appear to be the most active chain extension agents for the polymers processed according to the invention.

The quantity of polyunsaturated crosslinking agent mixed with the polymer should be sufficient such that a significant amount of polygrafting (chain extension) of the degraded polymer chains takes place to form a bimodal molecular weight distribution. The generation of a bimodal distribution can be viewed as depending upon the effective competition between addition of a polymer radical to a polyfunctional grafting agent and polymer scission which produces a lower molecular weight species. The greater is the tendency of the polymer to undergo free radical reduction of molecular weight, the more active a grafting agent will be required and/or the larger the quantity of grafting agent will be required. On the other hand, the quantity of grafting agent should not be so high that significant quantities remain in the polymer composition subsequent to processing. The preferred level of grafting agent addition lies in the range of from about 0.005 to about 1.0, more preferably from about 0.01 to about 0.5 millimoles per gram of polymer.

The process of chain extension or chain coupling operates through a free radical graft reaction mechanism. Where the starting polymer is one susceptible to production of radicals via shear alone, e.g. polyisobutylene, a free radical initiator need not be used. However, in general it is preferred to conduct the high shear mixing of the polymer and grafting agent in the presence of a free radical initiator source. The source may be physical, e.g. radiation or thermal, or chemical such as by combining an organic peroxide or organic azo compound with the mixture.

Typical organic peroxides include benzoyl peroxide; t-butyl peroxypivalate; 2,4-dichlorobenzoyl peroxide; decanoyl peroxide; propionyl peroxide; hydroxyheptyl peroxide; cyclohexanone peroxide; t-butyl perbenzoate; dicumyl peroxide; 2,5-dimethyl-2,5-di(t-butylperoxyl)-3-hexyne; 2,5-dimethyl-2,5-di(t-butylperoxy)hexane; 2,5-dimethyl-2,5-dibenzoylperoxyhexane; t-butyl peroxide; cumene hydroperoxide; 2,5-dimethyl-2,5-dihydroperoxy)-hexane; t-butyl hydroperoxide; lauroyl peroxide; t-amylperbenzoate, or mixtures thereof. Preferred organic peroxides are 2,5-dimethyl-2,5-di(t-butylperoxyl)-3-hexyne; 2,5-dimethyl-2,5-di(t-butylperoxy)hexane; and dicumyl peroxide. Mixtures of two or more of the above peroxides can also be used.

Suitable organo azo initiators which may be used include 2,2'-azobis(2-methylpropionitrile), 2,2'-azobis(2-methylvaleronitrile) and 4,4'-azobis(4-cyanovaleric acid).

The quantity of organic free radical initiator blended with the composition may generally range from about 0.0005 to about 0.1, more preferably from about 0.001 to about 0.05, millimoles per gram of the polymer.

The process of the invention may be carried out in solution or in the bulk phase using a suitable mixing device which provides polymer shear under mixing conditions sufficient to produce polymer chain scission. The process is preferably carried out using a bulk melt mixing apparatus such as Brabender mixer, an extruder or a Banbury mixer.

The process is preferably conducted by first forming a uniform melt mixture of the polymer and polyfunctional monomer, and then combining this mixture with a chemical free radical initiator or with a masterbatch of the polymer containing a chemical free radical initiator dispersed therein, although all ingredients may also be mixed simultaneously. Shear mixing is then conducted at a temperature above the melting point of the polymer, preferably at a temperature such that the allowed reaction time is at least about ten times the half-life of the chemical free radical initiator. Preferred mixing temperatures will generally range from about 150° C. to about 210° C. Mixing time may generally range from about 0.5 to about 60 minutes, more preferably from about 1 to about 10 minutes.

The composition may also contain other conventional ingredients such as fillers, reinforcing fibers, colorants and monounsaturated monomers, e.g. maleic anhydride. Preferably the composition is free of any added monounsaturated monomers.

In contrast to prior art processes, the present invention provides a post-polymerization process for modifying the molecular weight distribution of a conventionally prepared polymer having an initial monomodal molecular weight distribution. The product is a bimodal polymer having a low molecular weight mode with a peak molecular weight lower than that of the starting polymer and a high molecular weight mode with a peak molecular weight higher than that of the starting polymer.

The high molecular weight species generated by the grafting of the polyfunctional grafting agent may be insoluble, partially soluble or soluble in solvents which will dissolve the starting monomodal polymer. When these species are insoluble, they may be quantified as polymer gel content (i.e., the percentage of the whole polymer not soluble in the solvent). When they are soluble, they may be detected and quantified by gel permeation chromatography (GPC). The chromatogram will generally show two distinct peaks. Using the bottom of the valley between the peaks as a separation point, the weight percentage of the polymer represented by the high molecular weight peak can be calculated and used as a quantification of the high molecular weight species. The separation and integration of the peaks in the GPC differential refractive index (DRI) chromatogram is illustrated in the FIGURE. The resolution into two peaks and integration to calculate the % of the high molecular weight (low retention time) mode is indicated in the FIGURE.

Generally, a certain quantity of high molecular weight species will be required to impart desirable properties to the whole polymer. At least 1.0 weight percent of high molecular weight species is considered necessary to be useful and products with values lower than this are not considered as useful products of the present invention. Preferably the polymer will contain about 1 to 25 weight percent of the high molecular weight species, as measured from the GPC (DRI) curve.

When the high molecular weight species are insoluble, the presence of a bimodal molecular weight distribution and predominant formation of a low molecular weight mode may be inferred by observation of a reduction in bulk viscosity compared to that of the starting polymer. Conventional means of measuring bulk viscosity may be employed, e.g., Mooney viscosity for elastomeric polymers, melt flow rate for plastic polymers.

The products of the present invention are processable polymers. The products will flow under conditions of pressure, temperature and time that would create flow in the initial monomodal polymer. In the following examples, the infrared spectra spectrum of the products were usually recorded. The samples were thin (about 0.1 mm) films pressed under mild conditions in a Carver press. The ability to form such films under such mild conditions is a simple indication of processability.

The product polymers of the present invention may be further reacted to introduce useful functionalities, e.g., olefin polymers may be maleated and isobutylene copolymers may be halogenated. The product polymers may be blended with other polymers, filled, extended with oil, cured or any combination thereof to obtain useful products.

The following examples were carried out using the following polymers:

POLYMER A: a copolymer of isobutylene and 4-methylstyrene (about 4.4 mole percent).

POLYMER B: a copolymer of isobutylene and 4-methylstyrene (about 2.2 mole percent).

POLYMER C: a homopolymer of isobutylene.

POLYMER D: a copolymer of isobutylene and isoprene (about 0.8 mole percent).

POLYMER E: a copolymer of isobutylene and isoprene (about 1.1 mole percent).

POLYMER F: a copolymer of isobutylene and isoprene (about 2.0 mole percent).

POLYMER G: a copolymer of propylene and ethylene (about 1.6 weight percent).

Molecular weight or bulk viscosity data for these polymers is shown in the examples in which they are used. GPC data were obtained using trichlorobenzene as the solvent at 60° C.

The peroxide initiators used were dicumyl peroxide Lupersol® 101 or Lupersol® 130. The latter two were obtained from Atochem North America and contain about 90 percent by weight of 2,6-di-t-butyl-2,6-di-t-butylperoxyhexane or 90 to 95 percent by weight of 2,6-di-t-butyl-2,6-di-t-butylperoxyhex-3-yne, respectively, as the active component.

The polymaleimides used were:

IMIDE X: 1,3-phenylenebismaleimide (HVA2$^R$ from E. I. Dupont de Nemours)

IMIDE Y: 1,4-phenylenebismaleimide (from Aldrich Chemical Company)

IMIDE Z: 1,8-bismaleimido-3,6-dioxaoctane (Jeffamine$^R$EDR-148 bismaleimide from Texaco Chemical Company).

COMPARATIVE EXAMPLE 1

Polymer A, an isobutylene/4-methylstyrene copolymer (35 g) was added to a preheated 60 ml Brabender mixer and brought to 180° C. by mixing and heating. 1,3-Phenylenebismaleimide (0.55 g; 0.059 mmole/g of polymer) was added. Mixing and heating, sufficient to maintain the polymer temperature at 180° C., were continued for a further six minutes.

EXAMPLE 2

Example 1 was repeated as set forth, except that a masterbatch (0.4 g) containing 4.0 percent by weight of the peroxide LUPERSOL® 101 in polymer A was added immediately after the maleimide monomer and prior to the six minute mix.

The product from comparative example 1 was opaque and milky; that from example 2 was clear. The opaque appearance of the comparative example sample is consistent with the presence of unreacted imide, which is not soluble in the polymer. This was confirmed by the infrared spectra of the products. Thin films of both products were made in a Carver press at about 120° C. under a pressure of about 600 psi for 6 seconds. The infrared spectra of the films were similar, but not identical. A difference spectrum showed that bands at about 700 and 828 cm$^{-1}$ were present only in the case of comparative example 1. These bands are due to unreacted 1,3-phenylenebismaleimide. In analogy with the assignments for the bands at 696 and 842 cm$^{-1}$ in the spectrum of maleic anhydride [S. Seltzer, J. Amer. Chem. Soc., 83, 1861 (1961)] they are attributed to the symmetric and asymmetric out-of-plane stretching modes of the olefinic C—H bonds in unreacted 1,3-phenylenebismaleimide. The absence of these bands in the spectrum of the product from example 2 shows that the imide has undergone a reaction that involves the disappearance of its double bonds. Both spectra show an intense imide carbonyl band, noticeably broader in the case of example 2, at about 1717 cm$^{-1}$. Both products (1.0 g) dissolved in toluene (20 g) at room temperature forming clear almost colorless solutions. Acetone was added to the toluene solutions and the precipitated polymers were recovered and dried in a vacuum oven at 100° C. overnight. Nitrogen analysis showed 0.02 (comparative example 1) and 0.17 (example 2) percent by weight in the precipitated polymers.

The data above are consistent with the formation of a physical mixture in the absence of the peroxide (comparative example 1) and with the formation of a adduct, grafted through the double bonds of the imide, in its presence (example 2). In the latter case, the nitrogen analysis corresponds to grafting at a level of 0.061 mmole/g, equivalent, within experimental error, to the quantity charged.

Molecular weight distributions in trichlorobenzene at 60° C. were measured using a gel permeation chromatograph equipped with differential refractive index (DRI) and low angle laser light scattering (LALLS) detectors. The GPC data shows that the product of example 2 is bimodal while the product of comparative example 1 is not. Molecular weight data is summarized in Table 1 and includes, as a measure of bimodality, the weight percentage of the whole polymer represented by the high molecular weight peak as measured by the DRI detector.

TABLE 1

MOLECULAR WEIGHT AVERAGES (× 10⁻³)

| SAMPLE | POLYMER A | PRODUCT OF COMPARATIVE EXAMPLE | PRODUCT OF EXAMPLE 2 (WITH PEROXIDE) |
|---|---|---|---|
| $M_z$ (LALLS)* | 736 | 890 | 56724 |
| $M_w$ (LALLS) | 417 | 345 | 5940 |
| $M_w$ (DRI)* | 394 | 329 | 1130 |
| $M_n$ (DRI) | 181 | 150 | 110 |
| High Mol. Wt. Portion (DRI), wt. % | 0 | 0 | 12 |

*The terms LALLS and DRI are explained in the preceding paragraph.

Example 2 is an example of the present invention, comparative example 1 is not. These examples illustrate the ability of a peroxide initiator to bring about the present invention.

COMPARATIVE EXAMPLE 3 AND EXAMPLES 4 TO 7

Polymer B, an isobutylene/4-methylstyrene copolymer, (35 g) was added to a preheated 60 ml Brabender mixer and brought to 180° C. by a combination of mixing and heating. The quantities of 1,3-phenylenebismaleimide indicated in Table 2 were added and dispersed in the hot polymer by continued mixing for about one minute. Dicumyl peroxide as a 2 percent by weight masterbatch in polymer B (3.5 g) was added. Mixing and heating, sufficient to maintain the polymer temperature at 180° C., were continued for a further six minutes. The discharged products were allowed to cool to room temperature. Product data is shown in Table 2.

TABLE 2

QUANTITIES CHARGED & MOLECULAR WEIGHT AVERAGES (× 10⁻³)

| EXAMPLE | 3 | 4 | 5 | 6 | 7 |
|---|---|---|---|---|---|
| 1,3-Phenylmaleimide Grams | 0.00 | 0.15 | 0.31 | 0.77 | 1.54 |
| Mmole/G of Pohner B | 0.000 | 0.015 | 0.030 | 0.075 | 0.150 |
| $M_z$ (LALLS) | 321 | 3448 | 8739 | 18410 | 24811 |
| $M_w$ (LALLS) | 195 | 474 | 788 | 1796 | 2256 |
| $M_w$ (DRI) | 217 | 368 | 456 | 595 | 671 |
| $M_n$ (DRI) | 97 | 106 | 109 | 115 | 113 |
| High Mol. Wt. Portion, (DRI), wt. % | 0.0 | 1.8 | 3.9 | 6.6 | 7.2 |

Comparative example 3 is not an example of the present invention; examples 4 to 7 are. These examples show that the degree of product bimodality increases with increase in the quantity of polyfunctional grafting agent charged.

COMPARATIVE EXAMPLES 8 TO 11

These comparative examples were carried out in the manner of examples 4 to 7, except that N-phenylmaleimide (a monounsaturated monomer) in quantities shown in Table 3 replaced the 1,3-phenylenebismaleimide.

TABLE 3

QUANTITIES CHARGED & MOLECULAR WEIGHT AVERAGES (× 10⁻³)

| EXAMPLE | POLYMER B | 8 | 9 | 10 | 11 |
|---|---|---|---|---|---|
| N-Phenyl-maleimide Grams | — | 0.10 | 0.30 | 0.50 | 1.00 |
| Mmole/G of Polymer B | — | 0.015 | 0.030 | 0.075 | 0.150 |
| $M_z$ (LALLS) | 1137 | 397 | 367 | 464 | 523 |
| $M_w$ (LALLS) | 817 | 235 | 261 | 259 | 378 |
| $M_w$ (DRI) | 606 | 238 | 251 | 304 | 332 |
| $M_n$ (DRI) | 216 | 102 | 104 | 126 | 131 |
| High Mol. Wt. Portion, (DRI), wt % | 0.0 | 0.0 | 0.0 | 0.0 | 0.0 |

These comparative examples illustrate the absence of a bimodal molecular weight distribution when a monofunctional grafting agent replaced the bifunctional one used in examples 4 to 7. The comparative examples 8 to 11 are not examples of the present invention.

EXAMPLES 12 TO 18

Polymer B (240 g) was charged to a preheated 300 ml Brabender mixer and brought to 180° C. by a combination of mixing and heating. The quantity of 1,3-phenylenebismaleimide shown in Table 4 was added and dispersed in the hot polymer by continued mixing for about one minute. The quantity of dicumyl peroxide shown in Table 4 was added. Mixing and heating, sufficient to maintain the polymer temperature at 180° C., were continued for a further six minutes. The discharged products were allowed to cool to room temperature.

The data in Table 4 show that as the quantity of peroxide charged is increased (examples 12 through 15), the degree of product bimodality passes through a maximum. Simultaneous increase of maleimide and peroxide and maintaining them at constant ratio (examples 16 through 18) is a more effective means of increasing product bimodality. The DRI chromatogram for the product of example 18 is shown in the FIGURE.

On dissolution in toluene, the products from polymers D and E showed small amounts of insoluble material, as tiny discrete particles (microgels) which attached to the vessel walls. The gel content was estimated as follows. A sample of the product (about 5.0 g) in a fine mesh metal bag was placed in a sealed container along with toluene (about 150 ml) and was agitated on a shaker overnight. The mesh bag was removed from the container, washed 3 times with toluene on a filter funnel, dried in air overnight and finally dried in a vacuum oven at 100° C. for about 56 hours. The residual polymer in the mesh bag (gel content) amounted to 0.3 and 0.5 percent by weight of the original sample for examples 20

TABLE 4

QUANTITIES CHARGED & MOLECULAR WEIGHT AVERAGES ($\times 10^{-3}$)

| EXAMPLE | 12 | 13 | 14 | 15 | 16 | 17 | 18 |
|---|---|---|---|---|---|---|---|
| 1,3-Phenylenebismaleimide Grams | 2.4 | 2.4 | 2.4 | 2.4 | 4.8 | 9.6 | 19.2 |
| Mmole/G of Polymer B | 0.037 | 0.037 | 0.037 | 0.037 | 0.075 | 0.149 | 0.299 |
| Dicumyl Peroxide Grams | 0.12 | 0.24 | 0.48 | 0.96 | 0.24 | 0.48 | 0.96 |
| Mmole/G of Polymer B | 0.002 | 0.004 | 0.007 | 0.015 | 0.004 | 0.007 | 0.015 |
| $M_z$ (LALLS) | 42231 | 29359 | 27950 | 31548 | 51855 | 61295 | 71768 |
| $M_w$ (LALLS) | 2910 | 2985 | 2895 | 2625 | 3259 | 6774 | 13711 |
| $M_w$ (DRI) | 819 | 859 | 796 | 622 | 840 | 1261 | 1534 |
| $M_n$ (DRI) | 128 | 90 | 87 | 83 | 90 | 98 | 87 |
| High Mol. Wt. Portion, (DRI), wt % | 5.3 | 8.7 | 10.1 | 9.4 | 5.6 | 12.2 | 19.2 |

COMPARATIVE EXAMPLES 19 AND EXAMPLES 20 AND 21

These examples were carried out using polymers C, D and E respectively. These are isobutylene polymers with varying contents of isoprene comonomer. The polymer (240 g) was charged to a preheated 300 ml Brabender mixer and brought to 180° C. by a combination of mixing and heating. 1,3-Phenylenebismaleimide (2.4 g; 0.037 mmole/g of polymer) was added and dispersed in the hot polymer by continued mixing for about one minute. Dicumyl peroxide (0.24 g) was added. Mixing and heating, sufficient to maintain the polymer temperature at 180° C., were continued for a further six minutes. The discharged products were allowed to cool to room temperature.

and 21 respectively. This was considered sufficiently low that it would not pose a problem in the GPC instrument and molecular data obtained and are shown in Table 5.

TABLE 5

MOLECULAR WEIGHT AVERAGES ($\times 10^{-3}$)

| SAMPLE | EX. 19-POLYMER B | EX. 20-POLYMER D | EX. 21-POLYMER E |
|---|---|---|---|
| Isoprene, Mole Percent | 0.0 | 0.85 | 1.10 |
| $M_z$ (LALLS) | 1189 | 510 | 565 |
| $M_w$ (LALLS) | 946 | 350 | 387 |
| $M_w$ (DRI) | 857 | 360 | 376 |
| $M_n$ (DRI) | 402 | 117 | 133 |
| High Mol. Wt. Portion, (DRI), wt. % | 0 | 0 | 0 |
| SAMPLE OF | PRODUCT OF COMPARATIVE EX. 19 | PRODUCT OF EX. 20 | PRODUCT OF EX. 21 |
| $M_z$ (LALLS) | 51105 | 47125 | 34602 |
| $M_w$ (LALLS) | 660 | 3957 | 2216 |
| $M_w$ (DRI) | 326 | 900 | 627 |
| High Mol. Wt. Portion, (DRI), wt. % | 0.2 | 11* | 7* |

*Some insoluble gel also observed.

In comparative example 19 with polyisobutylene as the feed polymer, the product is bimodal but the high molecular weight mode (<1%) is too small to have a significant effect on product properties. A more active grafting agent than 1,3-phenylenemaleimide is needed in case of isobutylene homopolymer. When the isobutylene polymer has isoprene (examples 20 and 21) or 4-methylstyrene (examples 2, 4 to 7, 12 and 18) comonomers, significant and useful quantities of high molecular weight species are formed.

EXAMPLES 22 to 24

These examples were carried out with polymer D in the manner of example 20 except that the quantity of dicumyl peroxide was varied, as indicated in Table 6. The products dissolved in toluene with visible microgels, but were submitted to GPC. The results, together with data for polymer D and example 20 are shown in Table 6.

TABLE 6

| | QUANTITIES CHARGED & MOLECULAR WEIGHT AVERAGES ($\times 10^{-3}$) | | | | |
|---|---|---|---|---|---|
| EXAMPLE | POLYMER D | 22 | 20 | 23 | 24 |
| dicumyl peroxide, grams | | 0.00 | 0.24 | 0.48 | 0.96 |
| mmole/g of Polymer D | | 0.000 | 0.002 | 0.004 | 0.007 |
| $M_z$ (LALLS) | 510 | 10687 | 47125 | 8070 | 6978 |
| $M_w$ (LALLS) | 350 | 592 | 3957 | 511 | 326 |
| $M_w$ (DRI) | 360 | 293 | 900 | 244 | 166 |
| $M_n$ (DRI) | 117 | 60 | 95 | 43 | 31 |
| High Mol. Wt. Portion, (DRI), wt. % | 0.0 | 2.5* | 11* | 3.0* | 1.0* |

*Some insoluble gel also observed

The data for example 22 indicate formation of a bimodal product in the absence of a peroxide initiator. Free radicals may be produced by shear in the bulk polymer mixing device used as the reactor. This result contrasts with that of comparative example 1 and indicates that for an isobutylene polymer, the quantity and nature of the comonomer may determine whether or not the present invention can be realized using shear to generate the needed free radicals.

EXAMPLE 25

This example was carried out in the manner of example 21, except that polymer F was used instead of polymer E. Polymer F has a higher isoprene content (2.0 vs 1.1 mole percent) than polymer E. Though polymer F was completely soluble in toluene, the product had a gel content, measured as described for examples 20 and 21, of 10.1 percent by weight. GPC measurements were not attempted. The Mooney viscosity of the product (ML, 1+8, 125° C.) was 23.0 compared to 31.4 for polymer F. The increased gel content and lowered bulk viscosity compared to the starting material, indicate the formation of both higher and lower molecular weight species and are consistent with a bimodal molecular weight distribution.

EXAMPLE 26

Polymer G, a polypropylene copolymer (45 g) was charged to a preheated 60 ml Brabender mixer and brought to 190° C. 1,3-Phenylenebismaleimide (0.60 g; 0.05 mmole/g of polymer)was added, followed by Lupersol® 130 (0.13 g). Mixing and heating were continued for 4 minutes. The cooled product was ground in a mill.

A thin film of the product was pressed (at about 170° C. for 6 secs, under a pressure of 600 psi). Its infrared spectrum showed an absence of bands at about 838 and 700 cm$^{-1}$ and the presence of a strong imide carbonyl band at about 1716 cm$^{-1}$, indicative of grafting of the maleimide to the polymer. The film was soaked in methylene chloride overnight in an attempt to remove any unreacted maleimide. Nor change in its infrared spectrum was observed indicating quantitative grafting within experimental error.

The melt flow rate (measured at 230° C., under a load of 2.1 kg) of the product was 8.9 g/10 min., compared to 2.0 g/10 min. for polymer G. The increase in melt flow rate indicates formation of lower molecular weight species. On the other hand, the formation of higher molecular weight species is indicated by the insolubility of the product in refluxing xylene compared to the solubility of polymer G under the same conditions. Because of it low solubility, GPC measurements of molecular weight of the product could not be made, but the bulk viscosity and solubility data are consistent with a bimodal molecular weight distribution.

EXAMPLES 27 AND 28

These examples were carried out in the manner of example 13 except that the 1,3-phenylenebismaleimide was replaced by an approximately equimolar quantity of 1,4-phenylenebismaleimide (example 27) or bismaleimido-3.6-dioxaoctane (example 28). The data in Table 7 indicate that the former is more effective, the latter less effective than 1,3-phenylenebismaleimide in increasing product bimodality.

TABLE 7

| | QUANTITIES CHARGED & MOLECULAR WEIGHT AVERAGES ($\times 10^{-3}$) | | |
|---|---|---|---|
| EXAMPLE | 27 | 13 | 28 |
| IMIDE | Y | X | Z |
| grams | 2.4 | 2.4 | 2.8 |
| mmole/g of polymer B | 0.037 | 0.037 | 0.037 |
| $M_z$ (LALLS) | 35134 | 29359 | 19372 |
| $M_w$ (LALLS) | 4418 | 2985 | 2046 |
| $M_w$ (DRI) | 979 | 859 | 581 |
| $M_n$ (DRI) | 104 | 90 | 102 |
| High Mol. Wt. Portion, (DRI), wt. % | 13.3 | 8.7 | 7.7 |

What is claimed is:

1. A process for producing a polymer (A) having a bimodal molecular weight distribution from a polymer (B) having a monomodal molecular weight distribution, which polymer (B) normally exhibits a decrease in molecular weight when subjected to high shear mixing in the presence of free radical initiator, comprising:

a) heating a mixture of said polymer and a polyunsaturated crosslinking agent and, optionally, a free radical initiator to form a uniform mixture; and b) subjecting said mixture to high shear mixing conditions to obtain a polymer (A) having a bimodal molecular weight distribution, the low molecular weight mode having a peak molecular weight lower than that of polymer (B) and high molecular weight mode with a peak molecular weight higher than that of polymer (B).

2. The process of claim 1 wherein said mixing step (b) is conducted in the presence of a free radical initiator.

3. The process of claim 2 wherein said polymer is selected from the group consisting of polypropylene, copolymers of propylene with up to 10 mole % ethylene, polyisobutylene, copolymers of a $C_4$ to $C_7$ isomonoolefin with up to 10 wt % isoprene and copolymers of a $C_4$ to $C_7$ isomonoolefin with up to 20 wt % of para-alkylstyrene.

4. The process of claim 3 wherein said polyunsaturated crosslinking agent is a difunctional compound containing diallyl, divinyl or diethylenic unsaturation.

5. The process of claim 3 wherein said polyunsaturated crosslinking agent is selected from the group consisting of polymaleimides, polyallylphosphates, polyallylcyanurates, polyallyl esters of organic acids, polyallylamines; alkylene glycol poly(meth) acrylates and polyvinyl benzenes.

6. The process of claim 5 wherein said polyunsaturated crosslinking agent is an organo bismaleimide.

7. The process of claim 6 wherein said polyunsaturated crosslinking agent is a phenylenebismaleimide.

8. The process of claim 2 wherein said free radical initiator is an organic peroxide.

9. The process of claim 8 wherein said organic peroxide is selected from the group consisting of benzoyl peroxide; t-butyl peroxypivalate; 2,4-dichlorobenzoyl peroxide; decanoyl peroxide; propionyl peroxide; hydroxyheptyl peroxide; cyclohexanone peroxide; t-butyl perbenzoate; dicumyl peroxide; 2,5-dimethyl-2,5-di(t-butylperoxyl)-3-hexyne; 2,5-dimethyl-2,5-di(t-butylperoxy)hexane; 2,5-dimethyl-2,5-dibenzoylperoxyhexane; t-butyl peroxide; cumene hydroperoxide; 2,5-dimethyl-2,5-dihydroperoxy)-hexane; t-butyl hydroperoxide; lauroyl peroxide and t-amylperbenzoate.

10. The process of claim 1 wherein said polyunsaturated crosslinking agent is present at a level of from about 0.005 to about 1.0 millimoles per gram of said polymer.

11. The process of claim 10 wherein said level is about 0.01 to 0.5 millimoles.

12. The process of claim 10 wherein said free radical initiator is an organic peroxide present in said composition at a level of from about 0.005 to about 0.1 millimoles per gram of said polymer.

13. The process of claim 12 wherein said level is about 0.001 to 0.05 millimoles.

14. The process of claim 2 wherein said polymer is a random copolymer of isobutylene containing up to about 20 wt % of polymerized paramethylstyrene.

15. The process of claim 9 wherein said organic peroxide is selected from the group consisting of 2,5-dimethyl-2,5-di(t-butylperoxyl)-3-hexyne, 2,5-dimethyl-2,5-di(t-butylperoxy)hexane, dicumyl peroxide and mixtures thereof.

16. The process of claim 2 wherein said free radical initiator is added to said mixture after step (a) and prior to step (b).

17. The process of claim 2 wherein said high shear mixing is conducted for a period of from about 1 to 10 minutes.

18. The process of claim 17 wherein said high shear mixing is conducted at a temperature in the range of from about 150° C. to about 210° C.

19. A process for modifying the molecular weight distribution of a random copolymer of isobutylene containing up to about 20 wt % of polymerized para-methylstyrene comprising:

a) heating a mixture of said copolymer and from about 0.05 to about 0.5 millimoles per gram of said polymer of a polyunsaturated crosslinking agent to form a uniform melt mixture; and b) subjecting said melt mixture to high shear mixing conditions in the presence of an organic peroxide until a polymer having a bimodal molecular weight distribution is obtained.

20. The process of claim 19 wherein said organic peroxide is present in said mixture at a level of from about 0.001 to 0.05 millimoles per gram of said copolymer.

21. The process of claim 19 wherein said polyunsaturated crosslinking agent is an organo bismaleimide.

22. The process of claim 21 wherein said organic peroxide is selected from the group consisting of 2,5-dimethyl-2,5-di(t-butylperoxyl)-3-hexyne, 2,5-dimethyl-2,5-di(t-butylperoxy)hexane, dicumyl peroxide and mixtures thereof.

23. A product produced by the process of claims 1, 3, 6 or 19.

24. A polymer composition comprising a polymeric material selected from the group consisting of polypropylene, copolymers of propylene with up to 10 mole % ethylene, polyisobutylene, copolymers of a $C_4$ to $C_7$ isomonoolefin with up to 10 wt % isoprene, copolymers of a $C_4$ to $C_7$ isomonoolefin with up to 20 wt % of para-alkylstyrene and mixtures thereof, said polymeric material having a number average molecular weight in the range of from about 5,000 up to 5,000,000, and characterized as having a bimodal molecular weight distribution containing a lower molecular weight species and a higher molecular weight species, said higher molecular weight species comprising at least about 1.0 weight percent of said polymeric material.

25. The composition of claim 24 containing from about 1 to about 25 weight percent of said higher molecular weight species.

26. The composition of claim 24 wherein said polymeric material has a number average molecular weight in the range of from about 10,000 to about 1,000,000.

27. The composition of claim 26 wherein said polymeric material is a random copolymer of isobutylene containing up to about 20 wt % of polymerized para-methylstyrene.

\* \* \* \* \*